(12) United States Patent
Carleton

(10) Patent No.: US 6,550,560 B2
(45) Date of Patent: Apr. 22, 2003

(54) CONTROL HANDLE PIVOT APPARATUS

(75) Inventor: Gregory B. Carleton, Witchita, KS (US)

(73) Assignee: Case Corporation, Racine, WI (US)

( * ) Notice: Subject to any disclaimer, the term of this patent is extended or adjusted under 35 U.S.C. 154(b) by 63 days.

(21) Appl. No.: 09/927,970

(22) Filed: Aug. 10, 2001

(65) Prior Publication Data

US 2002/0060101 A1 May 23, 2002

Related U.S. Application Data

(60) Provisional application No. 60/259,437, filed on Nov. 22, 2000.

(51) Int. Cl.$^7$ .............................................. B60K 28/00
(52) U.S. Cl. ..................... 180/272; 180/89.12; 180/334
(58) Field of Search .............................. 180/89.12, 272, 180/315, 332, 334

(56) References Cited

U.S. PATENT DOCUMENTS

| | | | | |
|---|---|---|---|---|
| 5,050,700 A | * | 9/1991 | Kim ............................ | 180/268 |
| 5,971,434 A | * | 10/1999 | Neufeld et al. ............. | 280/756 |
| 6,431,303 B1 | * | 8/2002 | Muraro ....................... | 180/272 |
| 2002/0076314 A1 | * | 6/2002 | Zanetis et al. .............. | 414/680 |

* cited by examiner

Primary Examiner—Paul N. Dickson
Assistant Examiner—Laura B. Rosenberg
(74) Attorney, Agent, or Firm—A. N. Trausch

(57) ABSTRACT

A control handle pivot apparatus includes a pair of control handles movable toward and away from each other. A lap bar is movable between a raised position, spaced above the control handles, and a lowered position adjacent the handles. A linkage assembly interconnects the lap bar and the control handles. The linkage assembly is connected to move the handles away from each other in response to the lap bar being moved to the raised position, and is connected to move the control handles toward each other in response to the lap bar being moved to the lowered in-use position.

21 Claims, 7 Drawing Sheets

CONTROL HANDLE PIVOT APPARATUS

This application claims the benefit of Provisional Application No. 60/259,437 filed Nov. 22, 2000.

FIELD OF THE INVENTION

This invention relates to a pivot mechanism for control handles of a construction vehicle, and more particularly to a pivot mechanism that allows the control handles to pivot or tilt in or out when an operator lap bar is lowered or raised.

BACKGROUND OF THE INVENTION

Some construction vehicles, such as skid steer loaders, have an operator cage incorporating an integral roll-over protection structure (ROPS). The cage is mounted to the frame or chassis of the vehicle and includes an operator seat. The cage has a front opening positioned forward of the operator seat for entrance and exiting. Some vehicles also have a pivotal lap bar around the operator seat which, when raised by the operator, locks the vehicle ground drive and loader controls. The operator can then safely enter or exit the caged area that surrounds the operator seat. However, two control handles or levers for operating the travel and loader functions of the vehicle are positioned between the operator seat and the front opening. These control handles are often ergonomically tilted inward toward each other and therefore at least partially obstruct the operator ingress and egress.

Also, it is desirable to allow the operator cage, including the roll-over protection structure (ROPS) and the operator seat, to tilt forward to allow servicing of the drive components and controls that are located under the cage and seat. However, when the cage and seat are tilted forward, the seat often contacts the control handles, which are ergonomically tilted inward, thus limiting the forward tilt of the seat and access to the drive components.

Therefore, it is desirable to provide a less obstructed front access for the operator to enter or leave the vehicle. Also it is desirable to provide a mechanism that will allow the cage and seat to be tilted forward without interference with ergonomically tilted control handles. Finally, the raised lap bar must continue to be a safety lock when the operator is not seated.

SUMMARY OF THE INVENTION

An embodiment of this invention provides a control handle pivot apparatus for a construction vehicle, which provides less obstructed access for the operator when entering or leaving the vehicle. The control handle pivot apparatus includes a pair of control handles pivotally movable toward and away from each other. A lap bar is movable between a raised position, spaced above the control handles, and a lowered position adjacent the handles. A linkage assembly interconnects the lap bar and the control handles. The linkage assembly is connected to move the control handles away from each other in response to the lap bar being moved to the raised position, and is connected to move the control handles toward each other in response to the lap bar being moved to the lowered position.

An advantage of this invention is that operator access to the operator seat from the front opening is improved. Also the inward tilted control handles provide an ergonomic enhancement for the operator while not interfering with the full tilting of the cage or seat. The lap bar continues to provide a safety function.

DESCRIPTION OF THE PREFERRED EMBODIMENTS

Figure 1:
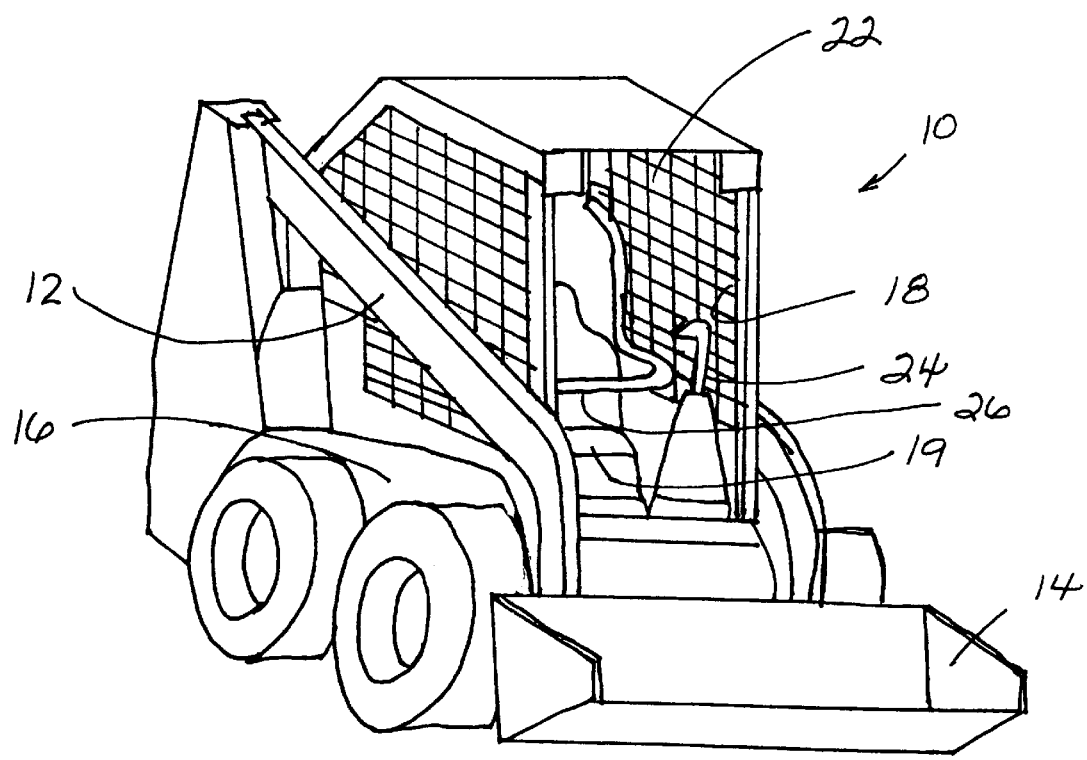
FIG. 1 is a perspective view illustrating an embodiment of a construction vehicle showing an operator cage including an operator seat, a lap bar and a pair of control handles.
Figure 2:
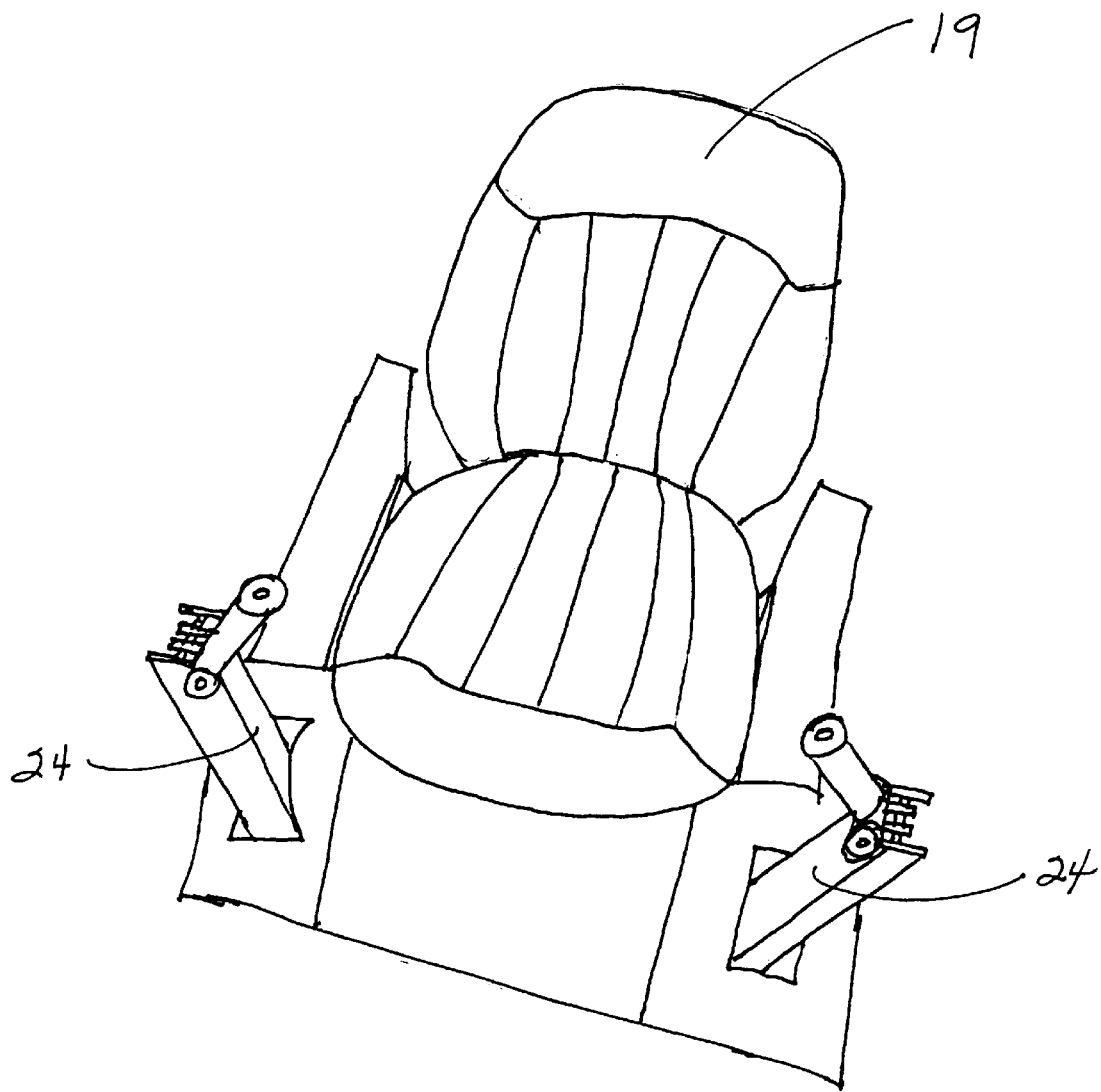
FIG. 2 is a perspective view illustrating an embodiment of an operator seat and ergonomically tiltable control handles in the vehicle of FIG. 1.

Referring now to the drawings, and in particular to FIGS. 1 and 2, a construction vehicle 10, such as a skid steer loader, is illustrated. Vehicle 10 is a self-propelled wheeled vehicle having a boom 12 for accommodating a front-end attachment 14 and a variety of other attachments (not shown). The vehicle has a frame or chassis 16 and includes an enclosed operator cage 18 with an integral ROPS and a seat 19 for an operator (not shown). A front opening 22 formed in the cage 18 provides the operator with a path to enter and exit the cage 18 for access to the seat 19. The cage 18 and seat 19 are pivotally mounted to tilt forward to allow full access to the drive components and controls under the cage and seat.

Figure 3:
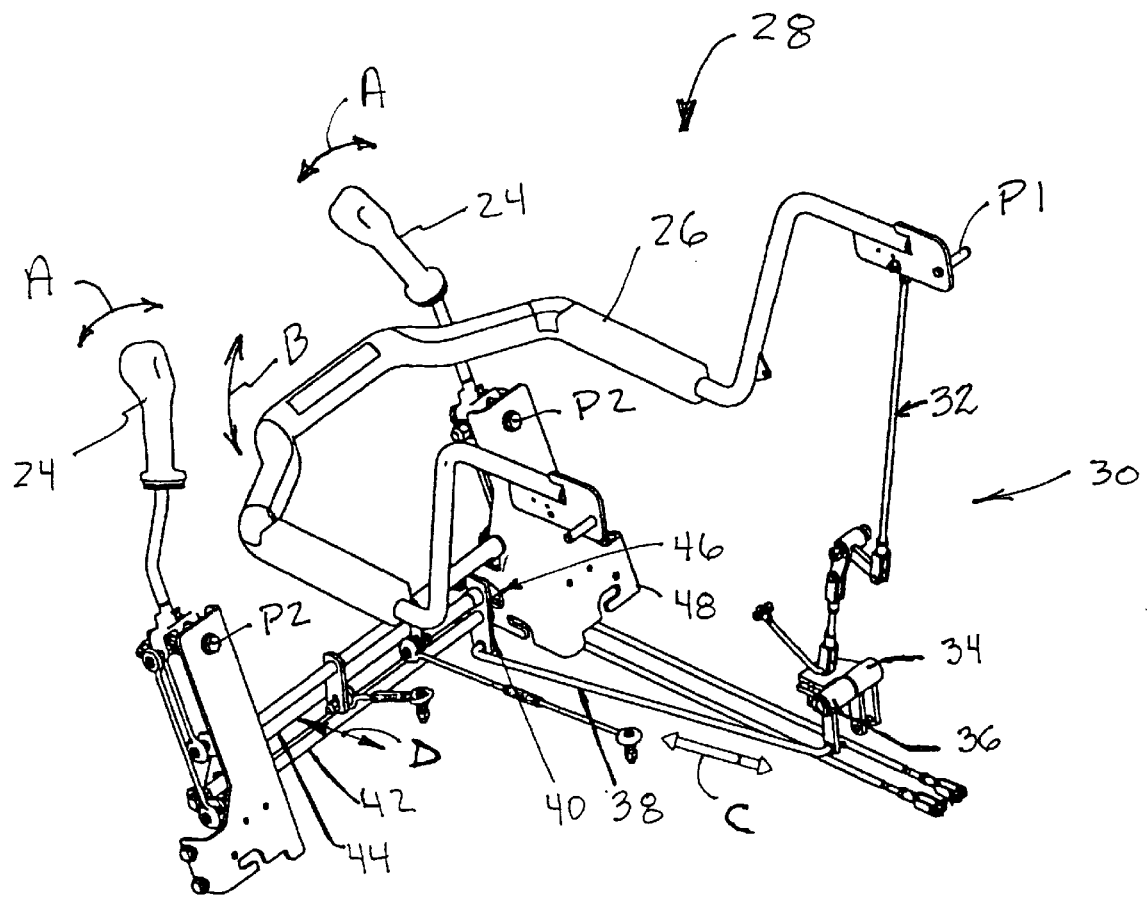
FIG. 3 is a perspective view illustrating an embodiment of a control handle pivot apparatus.

Referring now to FIGS. 2 and 3, a pair of control handles 24 and a lap bar 26 are provided in the cage 18. The control handles 24 are mounted between the seat 19 and the front opening 22. For operation of the vehicle, the control handles 24 are mounted forward of the operator's hands. In connection with the lowering and raising of the lap bar 26, the control handles 24 pivot or tilt inwardly toward each other and outwardly away from each other. The control handle tilting movement is indicated by the bi-directional arrows A in FIG. 3, and is discussed in further detail below. The lap bar 26 is movable between a raised position spaced above the control handles 24 and a lowered position adjacent the control handles 24. The lap bar movement is indicated by the bi-directional arrow B and is also discussed in further detail below.

Movement or tilting of the control handles 24 by the lap bar 26 prior to operation of the vehicle is enabled by a control handle pivoting apparatus 28, shown in FIG. 3. The control handle pivoting apparatus allows the control handles 24 to tilt or move toward each other to a position designated H1, shown in FIG. 4, and away from each other to a position designated H2, shown in FIG. 5. The tilting movement of the control handles is also indicated by the bi-directional arrow A in FIGS. 3, 4 and 5. The lap bar 26 is movable between a lowered position designated L1, shown in FIGS. 4 and 6, and a raised position designated L2, shown in FIGS. 5 and 7. The movement of the lap bar is also indicated by the bi-directional arrow B in FIGS. 3—7. In the lowered position L1 of FIGS. 4 and 6, the lap bar 26 is adjacent the control handles 24. In the raised position L2 of FIGS. 5 and 7, the lap bar 26 is spaced above and apart from the control handles 24.

From the perspective of the operator, in FIG. 3 for example, the lowered position L1, places the lap bar 26 adjacent the operator's lap, whereas the raised position L2, places the lap bar over the head of the operator. When the lap bar 26 is in the lowered in-use position L1, the control handles 24 are tilted ergonomically inward to be in line with the operator's hands. When the lap bar 26 is raised, the control handles 24 are tilted outward allowing improved access to the operator's seat.

The control handle pivoting apparatus 28, shown in FIG. 3, includes a linkage assembly 30 interconnecting the lap bar 26 and the control handles 24. The lap bar 26 is mounted for pivotal movement about a point P1 preferably mounted to the cage 18 (or alternatively to a frame portion.) The control handles 24 are each mounted for pivotal movement about a respective point P2 on the vehicle frame. The linkage assembly 30 includes expandable lap bar linkage members 32 connected to the lap bar 26. The lap bar linkage members 32 are connected to rotate a brake bell crank 34, which in turn rotates a control pivot bell crank 36. The control pivot bell crank 36 is connected to a control pivot link 38 that is attached to a control pivot assembly 40. The control pivot assembly 40 includes a pivot shaft 42 and a loader control shaft 44.

Figure 5:
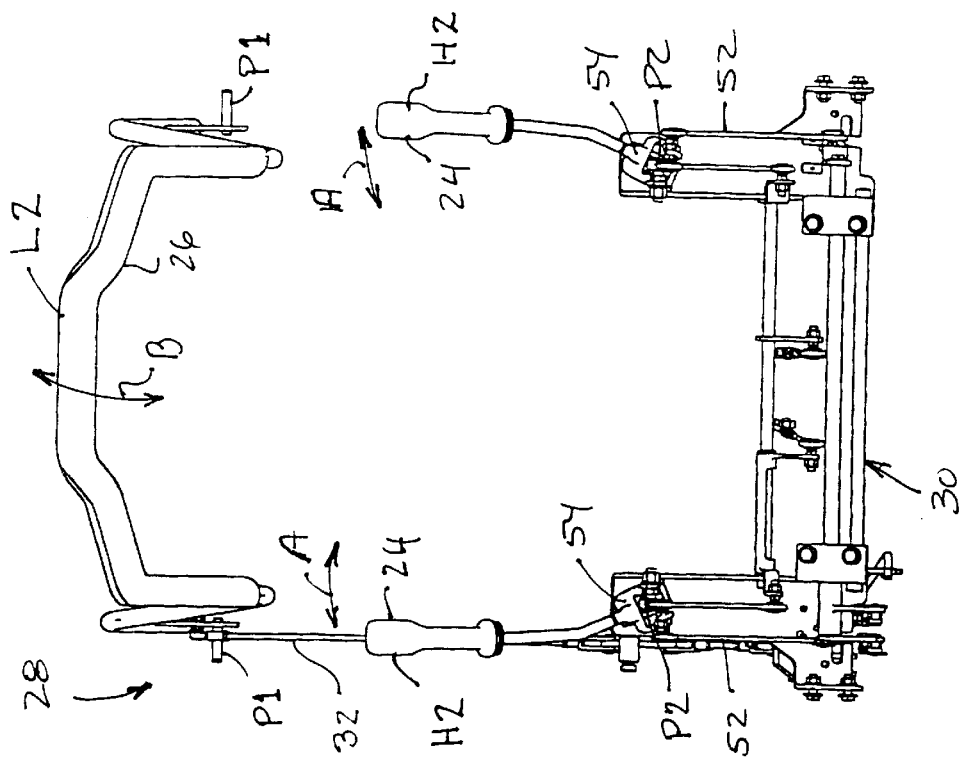
FIG. 5 is a front view illustrating the control handle pivot apparatus of FIG. 3 having the lap bar in a raised position.
Figure 4:
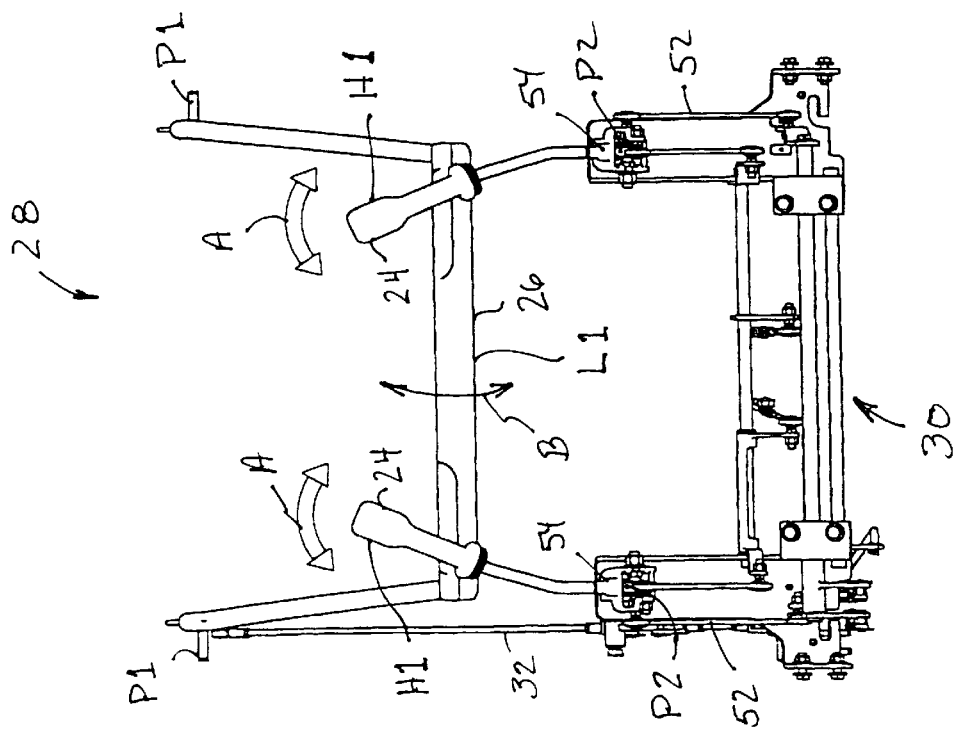
FIG. 4 is a front view illustrating the control handle pivot apparatus of FIG. 3 having the lap bar in a lowered in-use position.
Figure 7:
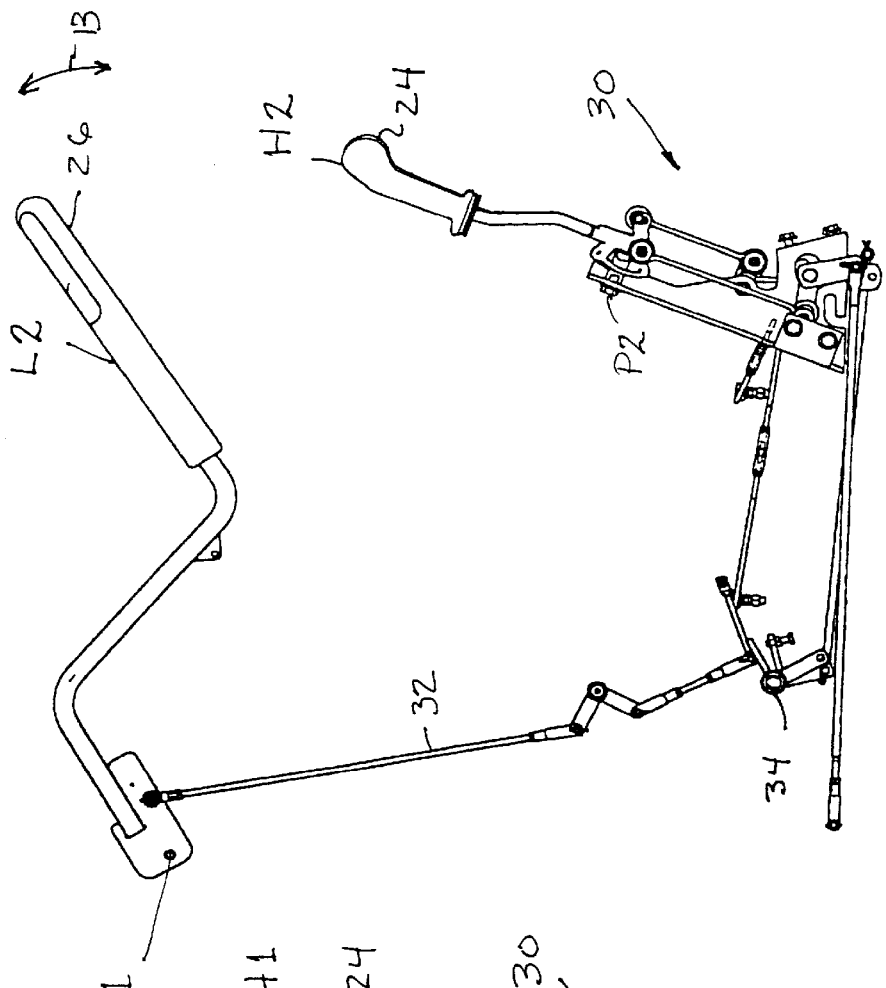
FIG. 7 is a side view illustrating the control handle pivot apparatus of FIG. 3 having the lap bar in the raised position and the control handles pivoted away from each other.
Figure 6:
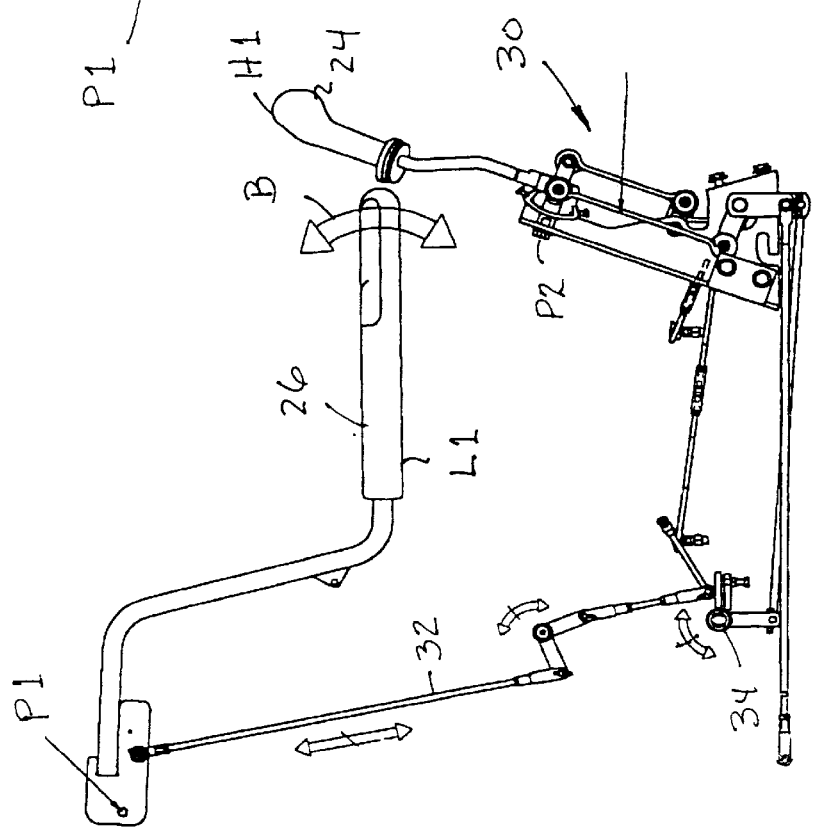
FIG. 6 is a side view illustrating the control handle pivot apparatus of FIG. 3 having the lap bar in the lowered in-use position and the control handles in an in-use position pivoted toward each other.

As a result of the connections described above, pivotal movement of lap bar 26, from the lowered position L1, as shown in FIGS. 4 and 6, to the raised position L2, as shown in FIGS. 5 and 7, extends the lap bar linkage members 32 and rotates brake bell crank 34 and control pivot bell crank 36. Conversely, pivotal movement of lap bar 26, from the raised position L2, as shown in FIGS. 5 and 7, to the lowered position L1, as shown in FIGS. 4 and 6, retracts the lap bar linkage members 32 and rotates brake bell crank 34 and control pivot bell crank 36 in an opposite direction. The rotation of bell crank 36 moves the control pivot link 38 in one of the directions indicated by the bi-directional arrow designated C, shown in FIG. 3. The movement of control pivot link 38 in either direction C rotates the control pivot assembly 40 about the pivot shaft 42, which moves loader control shaft 44 in a direction indicated by the bi-directional arrow designated D, shown in FIG. 3. Movement of loader shaft 44 is permitted within limits defined by a slot 46 in a frame portion 48.

Figure 8:
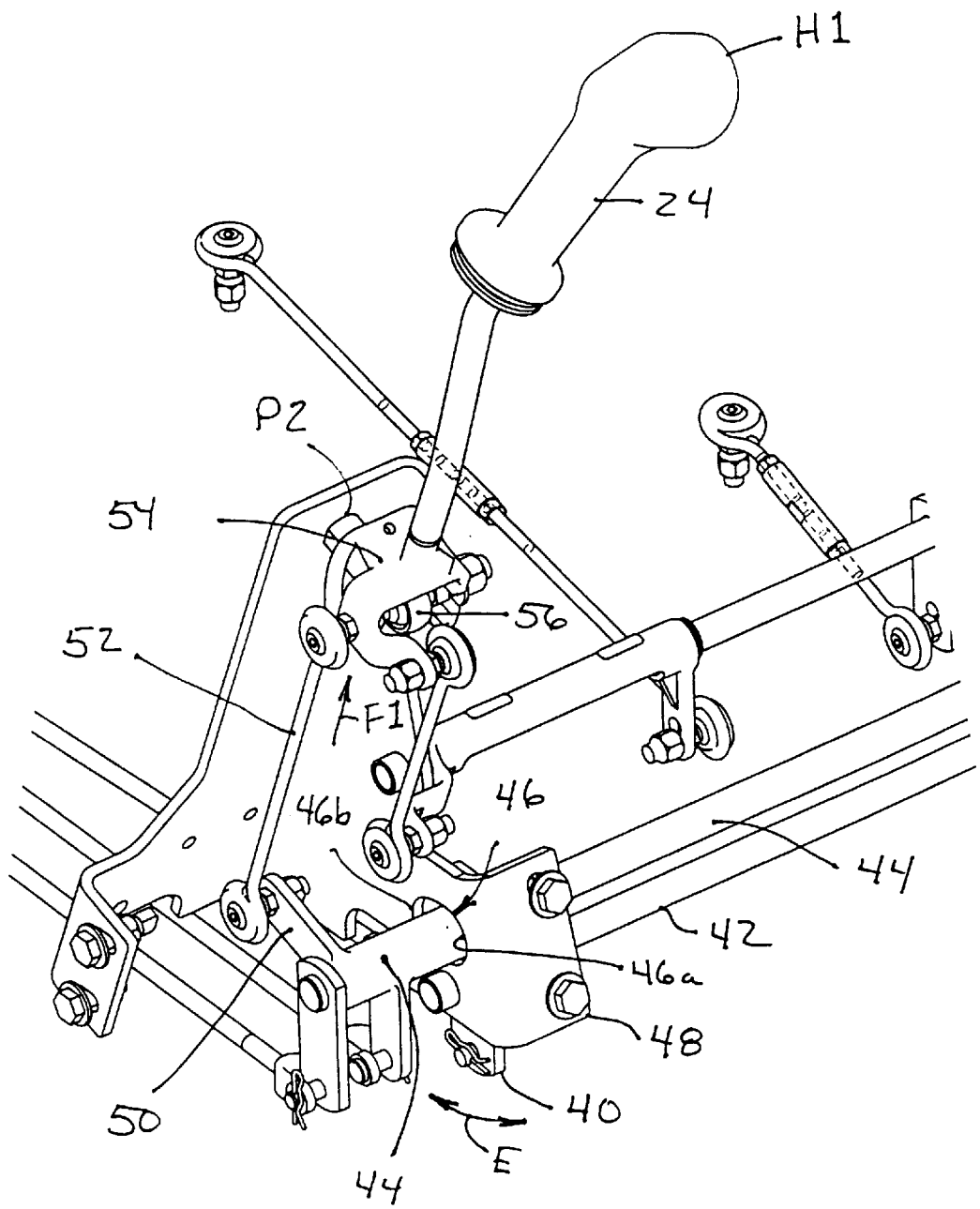
FIG. 8 is a partial perspective view illustrating one of the control handles pivoted inwardly.
Figure 9:
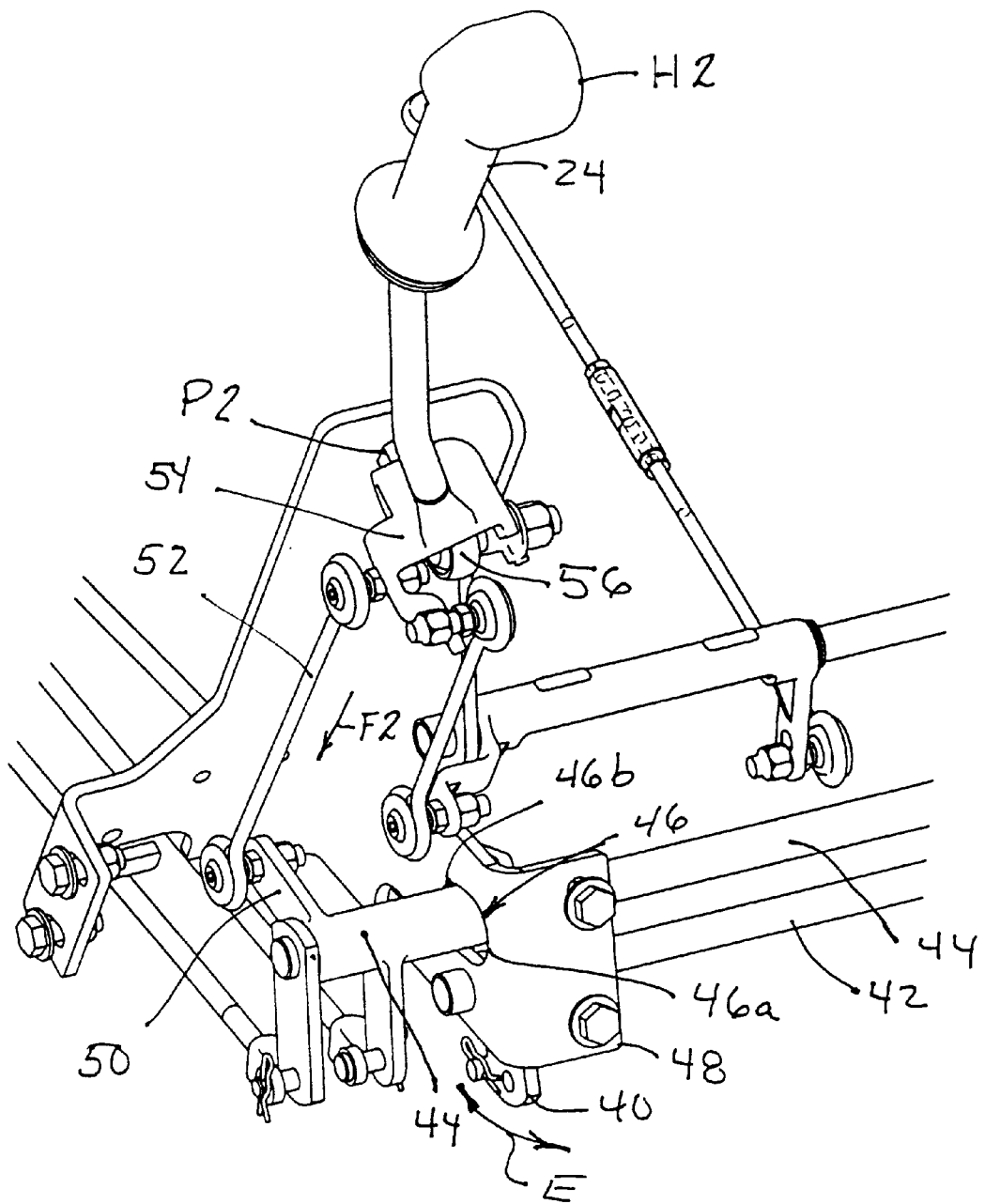
FIG. 9 is a partial perspective view illustrating one of the control handles pivoted outwardly.

Referring to FIGS. 8 and 9, rotation of the control pivot assembly 40 about the pivot shaft 42 occurs as indicated by the bi-directional arrow designated E, resulting in movement of loader control shaft 44 within the limits of slot 46 in frame portion 48. An arm 50 fixedly attached to loader control shaft 44, is connected to a pair of loader links 52, shown also in FIGS. 4 and 5. Each loader link 52 is connected to a handle pivot assembly 54. Each handle pivot assembly 54 is attached to a respective one of the control handles 24. Each pivot assembly 54 also includes a ball joint 56, which permits rotation of handle pivot assembly 54 about pivot point P2.

When the lap bar 26 is lowered, as shown in FIGS. 4, 6 and 8, the control pivot assembly 40 rotates about pivot shaft 42, in one direction, which moves loader control shaft 44 toward a forward end 46a of slot 46. The movement of shaft 44 moves each loader link 52 in an upward direction, indicated by the directional arrow designated F1, which rotates or pivots control handles 24 inwardly to position H1.

When the lap bar 26 is raised, as shown in FIGS. 5, 7 and 9, the control pivot assembly 40 rotates about pivot shaft 42 in an opposite direction, and moves loader control shaft 44 to an opposite, rear end 46b of slot 46. This movement of shaft 44 moves each loader link 52 in a downward direction, indicated by the directional arrow designated F2, which rotates or pivots control handles 24 outwardly to position H2.

As a result, one embodiment of the present invention provides a control handle pivoting apparatus 28 including a pair of control handles 24 movable toward (position H1) and away (position H2) from each other in conjunction with a lap bar 26 movable between and a lowered position L1 adjacent the handles and a raised position L2, spaced above the control handles. A linkage assembly 30 including a control pivot assembly 40 interconnects the lap bar and the control handles. The linkage assembly 30 and the control pivot assembly 40 are connected to move the control handles 24 away from each other in response to the lap bar 26 being moved to the raised position, and are connected to move the control handles toward each other in response to the lap bar being moved to the lowered position.

Another embodiment provides a construction vehicle including a frame 16 and a cage 18 with an operator seat 19. An operator opening 22 is provided in the cage for access to the seat. A pair of control handles 24 are mounted between the operator opening and the operator seat. The control handles are tilted or movable toward and away from each other. A lap bar 26 is movable between a raised position, spaced from the control handles, and a lowered position adjacent the handles. A linkage assembly 30 including a control pivot assembly 40 interconnects the lap bar and the control handles. The linkage assembly 30 and the control pivot assembly 40 are connected to move the control handles away from each other in response to the lap bar being moved to the raised position, and are connected to move the control handles toward each other in response to the lap bar being moved to the lowered position.

A further embodiment provides a method of pivoting or tilting control handles. The method includes providing a frame and cage and mounting a pair of control handles on the frame for movement toward and away from each other. A lap bar is mounted on the cage for movement between a raised position, spaced above the control handles, and a lowered position, adjacent the control handles. A linkage assembly 30 including a control pivot assembly 40 interconnects the lap bar and the control handles. The linkage assembly 30 and the control pivot assembly 40 are connected to pivotally move the control handles away from each other in response to the lap bar being moved to the raised position, and are connected to pivotally move the control handles toward each other in response to the lap bar being moved to the lowered position.

Another embodiment provides a method of providing operator access to a construction vehicle that includes providing a frame and a cage and mounting an operator seat in the cage. An operator opening is provided in the cage for access to the seat. A pair of control handles are mounted on the frame for movement toward and away from each other. A lap bar is mounted on the cage for movement between a raised position, spaced from the control handles, and a lowered position, adjacent the control handles. A linkage assembly 30 including a control pivot assembly 40 interconnects the lap bar and the control handles. The linkage assembly 30 and the control pivot assembly 40 are connected to move the control handles away from each other in response to the lap bar being moved to the raised position, and are connected to move the control handles toward each other in response to the lap bar being moved to the lowered position.

As discussed above, the advantages of these embodiments are that the tilting or pivoted outward movement of the control handles improves front access to the operator seat when the lap bar is raised. In addition, the cage and seat can be tilted forward without interfering with the ergonomically tilted control handles for full access to the drive components and controls under the cage.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A control handle pivot apparatus comprising:

a pair of control handles movable toward and away from each other;

a lap bar movable between a raised position, spaced from the control handles, and a lowered position adjacent the handles; and a linkage assembly interconnecting the lap bar and the control handles, the linkage assembly being connected to move the control handles away from each other in response to the lap bar being moved to the raised position, and being connected to move the control handles toward each other in response to the lap bar being moved to the lowered position.

2. The apparatus as defined in claim 1 wherein the linkage assembly includes a control pivot assembly.

3. The apparatus as defined in claim 2 wherein the control pivot assembly includes a pivot shaft and a loader control shaft.

4. The apparatus as defined in claim 3 wherein the loader control shaft is connected to a pair of loader links, each of the loader links being connected to pivot a respective one of the control handles, whereby the control handles are movable toward and away from each other.

5. The apparatus as defined in claim 1 wherein the lap bar is mounted on a frame member and is connected to a linkage assembly that includes a control pivot assembly.

6. The apparatus as defined in claim 5 wherein the control pivot assembly is connected to a pair of loader links, each of the loader links being connected to pivot a respective one of the control handles, whereby the control handles are movable toward and away from each other.

7. The apparatus as defined in claim 1 wherein the lap bar is pivotally mounted on a cage member.

8. The apparatus as defined in claim 7 wherein the control handles are pivotally mounted on a frame member.

9. The apparatus as defined in claim 8 wherein the lap bar is connected to move at least one lap bar linkage member.

10. The apparatus as defined in claim 9 wherein the lap bar linkage member is connected to rotate a brake bell crank.

11. The apparatus as defined in claim 10 wherein the brake bell crank is connected to rotate a pivot bell crank.

12. The apparatus as defined in claim 11 wherein the pivot bell crank is connected to move a control pivot link.

13. The apparatus as defined in claim 12 wherein the control pivot link is connected to rotate a control pivot assembly.

14. The apparatus as defined in claim 13 wherein the control pivot assembly includes a pivot shaft and a loader control shaft.

15. The apparatus as defined in claim 14 wherein the loader control shaft is connected to a pair of loader links, each of the loader links being connected to pivot a respective one of the control handles, whereby the control handles are movable toward and away from each other.

16. A construction vehicle comprising:

a frame;

an operator cage mounted on the frame including a seat;

an operator opening in the cage for access to the seat;

a pair of control handles mounted between the operator opening and the operator seat, the control handles being movable toward and away from each other;

a lap bar movable between a raised position spaced from the control handles, and a lowered position adjacent the control handles; and a linkage assembly including a control pivot assembly interconnecting the lap bar and the pair of control handles, the linkage assembly and the control pivot assembly being connected to move the control handles away from each other in response to the lap bar being moved to the raised position, and being connected to move the control handles toward each other in response to the lap bar being moved to the lowered position.

17. The vehicle as defined in claim 16 wherein the lap bar is connected to move the linkage assembly and rotate the control pivot assembly.

18. The vehicle as defined in claim 17 wherein the control pivot assembly includes a pivot shaft and a loader control shaft.

19. The vehicle as defined in claim 18 wherein the loader control shaft is connected to a pair of loader links, each of the loader links being connected to pivot a respective one of the control handles, whereby the control handles are movable toward and away from each other.

20. A method of pivoting a control handle comprising:

providing a frame and a pivotally mounted operator cage;

mounting a pair of control handles on the frame for movement toward and away from each other;

mounting a lap bar on the cage for movement between a raised position, spaced from the control handles, and a lowered position, adjacent the control handles; and interconnecting the lap bar and the pair of control handles with a linkage assembly including a control pivot assembly, the linkage assembly and the control pivot assembly being connected to move the control handles away from each other in response to the lap bar being moved to the raised position, and being connected to move the control handles toward each other in response to the lap bar being moved to the lowered position.

21. A method of providing operator access to a construction vehicle comprising:

providing a frame;

mounting a cage and an operator seat on the frame;

providing an operator opening in the cage for access to the seat;

mounting a pair of control handles on the frame for tilting movement toward and away from each other;

mounting a lap bar on the cage for movement between a raised position, spaced from the control handles, and a lowered position, adjacent the control handles; and interconnecting the lap bar and the pair of control handles with a linkage assembly including a control pivot assembly, the linkage assembly and the control pivot assembly being connected to move the control handles away from each other in response to the lap bar being moved to the raised position, and being connected to move the control handles toward each other in response to the lap bar being moved to the lowered position.

* * * * *